(12) United States Patent
Champseix et al.

(10) Patent No.: US 9,766,951 B2
(45) Date of Patent: Sep. 19, 2017

(54) HARDWARE SYNCHRONIZATION BARRIER BETWEEN PROCESSING UNITS

(71) Applicant: KALRAY, Orsay (FR)

(72) Inventors: Thomas Champseix, Grenoble (FR); Benoît Dupont De Dinechin, Grenoble (FR); Pierre Guironnet De Massas, Allevard (FR)

(73) Assignee: KALRAY, Orsay (FR)

( * ) Notice: Subject to any disclaimer, the term of this patent is extended or adjusted under 35 U.S.C. 154(b) by 0 days.

(21) Appl. No.: 14/721,695

(22) Filed: May 26, 2015

(65) Prior Publication Data

US 2015/0339173 A1 Nov. 26, 2015

Related U.S. Application Data

(60) Provisional application No. 62/002,541, filed on May 23, 2014.

(30) Foreign Application Priority Data

Dec. 5, 2014 (FR) ...................................... 14 61941

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 15/00* | (2006.01) |
| *G06F 15/76* | (2006.01) |

(Continued)

(52) U.S. Cl.
CPC ................ *G06F 9/522* (2013.01); *G06F 9/52* (2013.01); *G06F 9/54* (2013.01)

(58) Field of Classification Search
None
See application file for complete search history.

(56) References Cited

U.S. PATENT DOCUMENTS 7,308,607 B2 * 12/2007 Reinhardt ............. G06F 9/3863
712/E9.053
7,788,468 B1 8/2010 Nickolls et al.
(Continued)

OTHER PUBLICATIONS

Yastrebkov, "How to set, clear, toggle and check a single bit in C", published on Jan 23, 2012, http://blog.yastrebkov.com/2012/01/how-to-set-clear-toggle-and-check.html.*
(Continued)

*Primary Examiner* — Charles Swift
(74) *Attorney, Agent, or Firm* — Oliff PLC

(57) ABSTRACT

A method for synchronizing multiple processing units, comprises the steps of configuring a synchronization register in a target processing unit so that its content is overwritten only by bits that are set in words written in the synchronization register; assigning a distinct bit position of the synchronization register to each processing unit; and executing a program thread in each processing unit. When the program thread of a current processing unit reaches a synchronization point, the method comprises writing in the synchronization register of the target processing unit a word in which the bit position assigned to the current processing unit is set, and suspending the program thread. When all the bits assigned to the processing units are set in the synchronization register, the suspended program threads are resumed.

11 Claims, 3 Drawing Sheets

(51) Int. Cl.
*G06F 9/52* (2006.01)
*G06F 9/54* (2006.01)

(56) References Cited

U.S. PATENT DOCUMENTS

| | | | | |
|---|---|---|---|---|
| 7,861,060 | B1* | 12/2010 | Nickolls | G06F 9/522 712/22 |
| 8,286,180 | B2* | 10/2012 | Foo | G06F 9/3851 712/19 |
| 2003/0084269 | A1* | 5/2003 | Drysdale | G06F 9/544 712/36 |
| 2004/0073906 | A1* | 4/2004 | Chamdani | G06F 9/30134 718/102 |
| 2005/0240943 | A1* | 10/2005 | Smith | G06F 9/465 719/328 |
| 2006/0004988 | A1* | 1/2006 | Jordan | G06F 9/3851 712/43 |
| 2008/0077921 | A1* | 3/2008 | Chaudhary | G06F 9/52 718/100 |
| 2009/0300643 | A1* | 12/2009 | Gove | G06F 9/52 718/106 |
| 2010/0115236 | A1* | 5/2010 | Bataineh | G06F 9/52 712/29 |
| 2011/0078417 | A1* | 3/2011 | Fahs | G06F 9/30145 712/216 |
| 2011/0154064 | A1* | 6/2011 | Niekrewicz | G06F 9/30079 713/300 |
| 2011/0283095 | A1* | 11/2011 | Hall | G06F 9/3009 712/228 |
| 2012/0179896 | A1* | 7/2012 | Salapura | G06F 9/30087 712/203 |
| 2014/0282564 | A1* | 9/2014 | Almog | G06F 9/522 718/102 |
| 2014/0282566 | A1* | 9/2014 | Lindholm | G06F 9/522 718/102 |

OTHER PUBLICATIONS

Beckmann et al, "Fast Barrier Synchronization Hardware", 1990, IEEE, pp. 180-189.*

Benoît Dupont de Dinechin et al, "A Distributed Run-Time Environment for the Kalray MPPA-256 Integrated Manycore Processor," International Conference on Computer Science (ICCS), 2013, vol. 18, pp. 1654-1663.

Villa, Oreste, et al., "Efficiency and Scalability of Barrier Synchronization on NoC Based Many-core Architectures," in "International conference on compilers, architectures and synthesis for embedded systems," pp. 81-90, Oct. 19-24, 2008, Atlanta, GA, USA.

Dupont de Dinechin, Benoit, et al., A Clustered Manycore Processor Architecture for Embedded and Accelerated Applications, in "High Performance Extreme Computing Conference (HPEC)," 2013, IEEE, 10-12, Sep., 2013.

Jul. 3, 2017 Search Report issued in French Patent Application No. 1461941.

* cited by examiner

HARDWARE SYNCHRONIZATION BARRIER BETWEEN PROCESSING UNITS

FIELD

The present disclosure relates to the synchronization of processes executed in parallel on several processor cores.

BACKGROUND

Barrier synchronization is a key primitive of parallel programming. It can be applied either between cores that share a cache of a memory, or between clusters of cores, where each cluster has its local memory, and where clusters are connected by a network.

A hardware synchronization barrier is mentioned in [Benoît Dupont de Dinechin, Pierre Guironnet de Massas, G. Lager et al. "A Distributed Run-Time Environment for the Kalray MPPA-256 Integrated Manycore Processor", International Conference on Computational Science (ICCS), Volume 18, pages 1654 to 1663, Barcelona, Spain, 2013, Elsevier].

According to this article, each core or cluster of cores has mailboxes that can be configured in a synchronization mode. In this mode, the payload of an incoming message is bitwise OR-ed with the previous content of the mailbox, and a master core is only notified if the new content has all bits to 1.

SUMMARY

A method is provided herein for synchronizing multiple processing units, comprising the steps of configuring a synchronization register in a target processing unit so that its content is overwritten only by bits that are set in words written in the synchronization register; assigning a distinct bit position of the synchronization register to each processing unit; and executing a program thread in each processing unit. When the program thread of a current processing unit reaches a synchronization point, the method comprises writing in the synchronization register of the target processing unit a word in which the bit position assigned to the current processing unit is set, and suspending the program thread. When all the bits assigned to the processing units are set in the synchronization register, the suspended program threads are resumed.

A method is also provided for synchronizing parallel processes, comprising the steps of distributing multiple program execution threads between processing units; configuring a synchronization register in each processing unit so that its content is overwritten only by bits that are set in words written in the synchronization register; and assigning a distinct bit position of the synchronization registers to each program thread. When a current program thread in a current processing unit has reached a synchronization point, the method comprises writing by the current processing unit in the synchronization registers of all the processing units a word in which the bit position assigned to the current program thread is set, and suspending the current program thread. When all the bits assigned to the program threads are set in the synchronization register of a current processing unit, the method comprises resuming the execution of the suspended program threads in the current processing unit, and resetting the synchronization register of the current processing unit.

The method may comprise the following steps carried out within each processing unit: comparing the content of the synchronization register with an expected value; asserting a notification signal when the comparison is true; and resuming execution of the suspended program threads in response to the assertion of the notification signal.

The method may comprise the following steps carried out within each processing unit: running in parallel several program threads on respective cores of the processing unit; and programming a register of participants with a word having bits set at positions assigned to the cores. When a thread reaches its synchronization point, the execution of the thread is suspended. Upon assertion of the notification signal, the bits of the register of participants are provided to the respective cores on dedicated lines, and the execution is resumed for the threads in the cores corresponding to the dedicated lines that are set.

BRIEF DESCRIPTION OF DRAWINGS

Other advantages and features will become more clearly apparent from the following description of particular embodiments of the invention provided for exemplary purposes only and represented in the appended drawings, in which.

DESCRIPTION OF EMBODIMENTS

Figure 1:
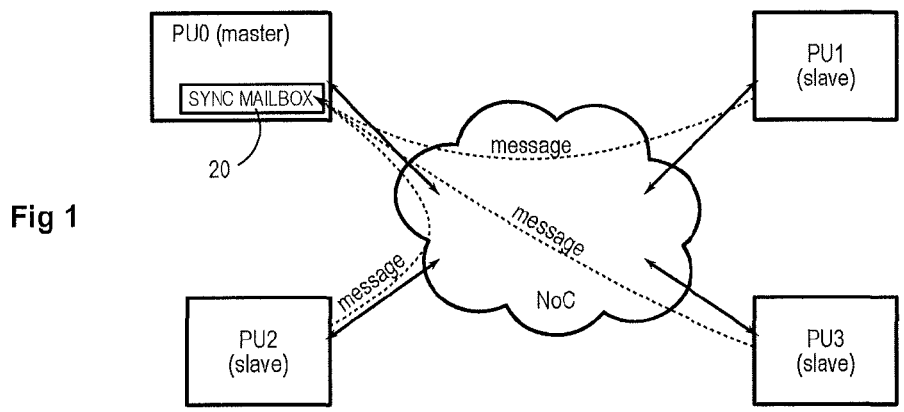
FIG. 1 schematically shows a network-on-chip infrastructure implementing an embodiment of a hardware synchronization barrier managed in a master-slave mode.

FIG. 1 shows several processing units PU0 to PU3, such as processor cores or clusters of cores that are connected to exchange information through messages on a network-on-chip NoC. In general, each processing unit comprises several mailbox registers and a message can target a specified mailbox register of a specified processing unit.

To implement a hardware synchronization barrier according to the teachings of the aforementioned ICCS article, one of the processing units PU0 may be configured as a master and a designated mailbox of the master-processing unit may be configured as a synchronization mailbox 20 for a group of processing units, e.g. units PU0 to PU3.

Several execution threads of a same computer program may be distributed among the processing units and require a synchronization. To each thread, or core allocated to the thread is assigned a unique identifier in the form of a bit position in the synchronization mailbox 20, in practice a register.

When a thread has reached a synchronization point, or a barrier, a message is sent to the synchronization mailbox. The message content includes an identifier configured to have all bits unset except at the position that identifies the thread or core. The thread is then suspended. In practice, the suspension of a thread may be obtained by stopping the core running the thread, for example by providing a suspension instruction (WAIT) in the executable code of the thread. The suspension instruction then stops the core and configures it to resume execution in response to an external event defined in the suspension instruction, for example the assertion of a specific signal by a resource manager of the processing unit. In other architectures, the suspension instruction may issue an interruption causing the core, not to stop but to switch to another task. Then the assertion of the aforementioned signal interrupts the core again and leads it to resume the suspended thread.

FIGS. 2A to 2E illustrate an embodiment of a hardware synchronization barrier through several steps of a detailed synchronization example.

Figure 2A:
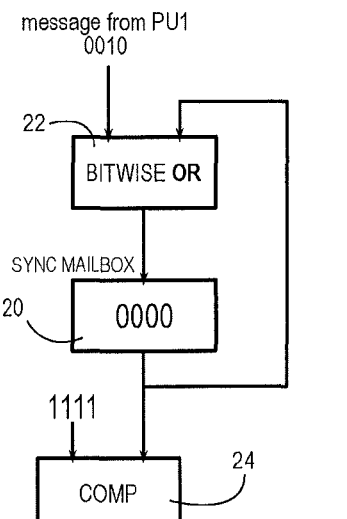
FIGS. 2A to 2E illustrate components of a hardware synchronization barrier in several stages during the processing of an exemplary of synchronization.

As shown in FIG. 2A, the content of the synchronization mailbox or register 20 is updated with the result of a bitwise OR 22 between the previous content of the register and the content of the incoming message, in this example the message 0010 indicating that the thread of the processing unit PU1 has reached the synchronization barrier. The content of the synchronization register is further compared at 24 to a pattern indicating that all threads have reached the barrier, e.g. the pattern 1111. In FIG. 2A, the synchronization mailbox 20 has just been reset and contains pattern 0000, whereby the comparison yields "false".

Figure 2B:
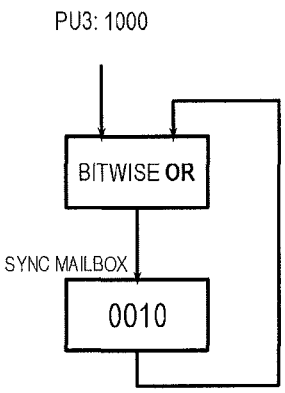

In FIG. 2B, the synchronization mailbox has been updated to 0010 and receives a message 1000 indicating that the thread of the processing unit PU3 has reached the barrier. The comparison 24 yields "false".

Figure 2C:
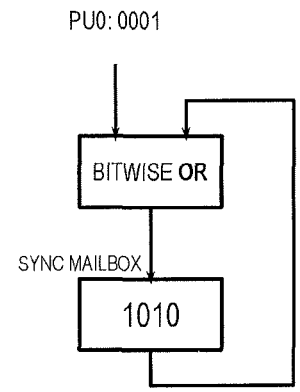

In FIG. 2C, the synchronization mailbox has been updated to 1010 and receives the message 0001 indicating that the thread of processing unit PU0 has reached the barrier. This message may be sent from the master-processing unit to itself, since the master-processing unit can also be used to process a thread. The comparison still yields "false".

Figure 2D:
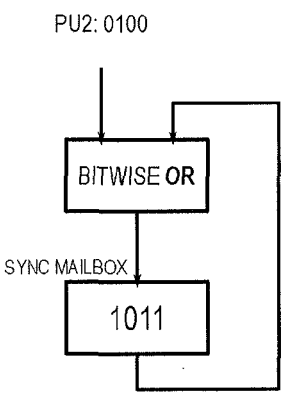

In FIG. 2D, the synchronization mailbox has been updated to 1011 and receives the message 0100. The comparison still returns "false".

Figure 2E:
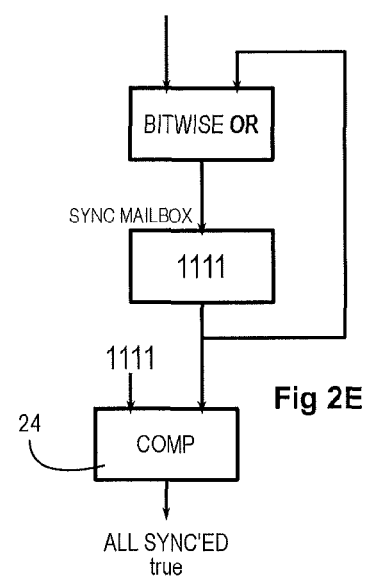

In FIG. 2E, the synchronization mailbox has been updated to 1111. All threads have reached the barrier and sent their message. The comparison 24 now returns "true", meaning that the synchronization barrier is raised. This event may interrupt the resource manager of the master-processing unit PU0, which can then multicast a notification through the network to all processing units. The resource managers of the processing units respond to this notification by causing the execution of the suspended threads to resume. The master-processing unit further resets the synchronization mailbox for setting the next synchronization barrier.

The structure of FIG. 1 however involves sending messages over the network for raising the synchronization barrier, to resume the suspended threads, whereby the cores may restart asynchronously and with an undetermined delay after raising of the barrier.

Figure 3:
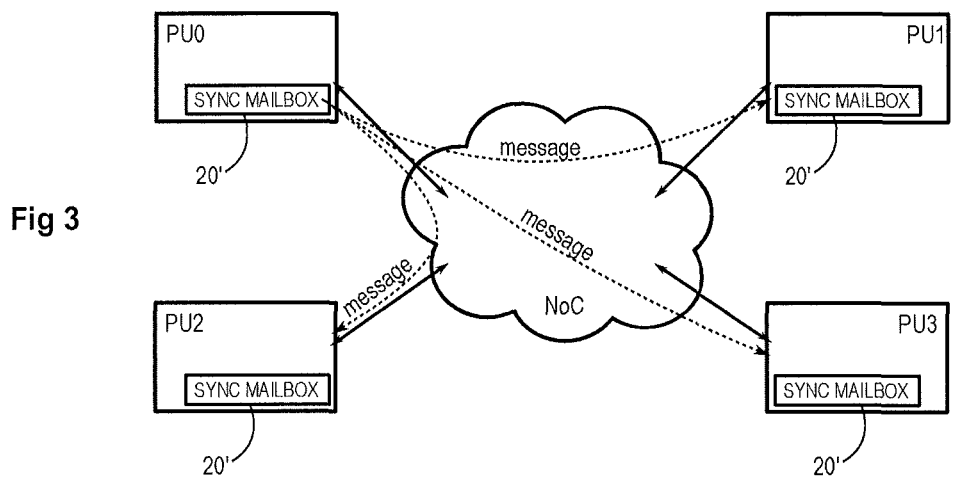
FIG. 3 schematically shows a network-on-chip infrastructure implementing an embodiment of a hardware synchronization barrier managed in a distributed manner.

FIG. 3 schematically shows a network-on-chip infrastructure implementing an embodiment of a synchronization barrier offering a rapid recovery of suspended threads when the barrier is raised. Unlike the master-slave structure of FIG. 1, the structure of FIG. 3 operates in a distributed manner in that each processing unit manages a local synchronization mailbox, designated by 20', which duplicates the contents of the other local synchronization mailboxes.

In general, each processing unit (e.g. unit PU0 of FIG. 3), when it reaches the synchronization barrier, instead of sending a single message to a master, it multicasts the same message to all processing units. Each processing unit, including the one that has issued the message, reacts to this message by updating its local synchronization mailbox according to the technique described above, i.e. with a bitwise OR of the message content and the previous content of the mailbox. In this way, each processing unit has a local copy of the content of the single mailbox of the master-processing unit of FIG. 1. Each processing unit may then resume the suspended thread as soon as its local mailbox reaches the raising condition of the barrier, without sending another message.

Figure 4:
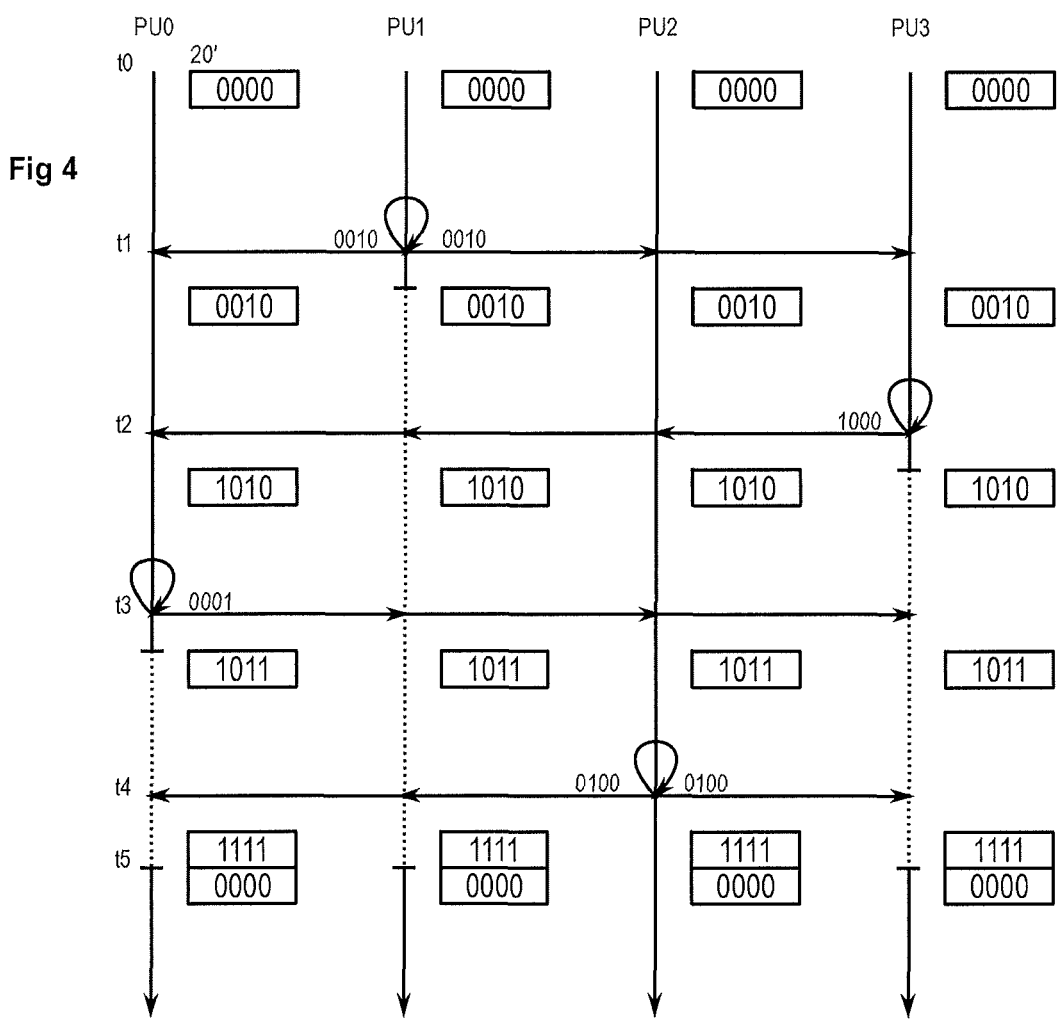
FIG. 4 is a timing diagram illustrating the operation of a distributed synchronization barrier in the context of an example.

FIG. 4 is a timing diagram illustrating the operation of a distributed synchronization barrier through an example. A thread running in each of the processing units PU0 to PU3 is represented by a vertical line, along a downwards-increasing time axis. The content of register 20' used as the local synchronization mailbox is shown next to the thread at different times. The example corresponds to that of FIGS. 2A to 2E.

At a time t0, the program threads executed in processing units PU0 to PU3 are ongoing. Registers 20' are at their initial value 0000.

At a time t1, the thread executed in the unit PU1 reaches the synchronization barrier. The message 0010 is multicast through the network to all processing units, including the unit PU1 itself. To simplify the diagram, the multicast message is represented by horizontal arrows, implying that it is simultaneous and instantaneous. In practice, the messages to different processing units may be transmitted one after the other in the network and reach their destinations at different times, depending on the congestion of the network—this does not alter the principle of operation.

Upon receiving the message 0010, each processing unit, including unit PU1 updates its local synchronization register 20' with the value 0000 OR 0010=0010.

The thread of unit PU1 is suspended. The suspension phase is represented by a dotted line.

At a time t2, the thread running in the unit PU3 reaches the synchronization barrier. The message 1000 is multicast through the network to all processing units, including the unit PU3 itself.

Upon receipt of the message 1000, each processing unit, including unit PU3 updates its local synchronization register 20' with the value 0010 OR 1000=1010.

The thread of unit PU3 is suspended. The suspension phase is represented by a dotted line.

At a time t3, the thread running in the unit PU0 reaches the synchronization barrier. The message 0001 is multicast through the network to all processing units, including the unit PU0 itself.

Upon receipt of the message 0001, each processing unit, including unit PU0 updates its local synchronization register 20' with the value 1010 OR 0001=1011.

The thread of unit PU0 is suspended. The suspension phase is represented by a dotted line.

At a time t4, the thread running in the unit PU2 reaches the synchronization barrier. The message 0100 is multicast through the network to all processing units, including the unit PU2 itself.

Upon receiving the message 0100, each processing unit, including unit PU2 updates its local synchronization register 20' with the value 1011 OR 0100=1111.

At a time t5, the processing units detect that the synchronization barrier is raised due to the content 1111 present in their local synchronization registers 20', whereby they resume the suspended threads, and reset the registers 20'.

Since the synchronization register 20' is local, each processing unit may include a simple logic circuit designed to compare the contents of this register to a raised-barrier pattern, programmed for example in another register, and assert a signal on a dedicated line that reports the expected event for resuming the thread execution.

In that case, the thread in unit PU2, which can anticipate the value of register 20', does not require suspension, or only briefly during the time for taking into account the message 0100 sent by the processing unit PU2 to itself. Such local messaging is very fast because it occurs in practice without going through the network.

Each processing unit may be a cluster of multiple processor cores connected through a bus. In this case, a thread to be synchronized may be executed by one of the cores and another core may be used as the resource manager, in particular to manage the messaging communication and the synchronization register (20, 20'). A cluster may even run a plurality of the threads to synchronize, each on a different core. Then the identifiers conveyed in the synchronization messages may identify several threads in a same cluster and a cluster will manage as many separate synchronization messages as threads executed in the cluster. The number of threads that can be executed in parallel is then defined by the size of the identifiers, which size can be larger than the number of clusters connected to the network-on-chip.

Figure 5:
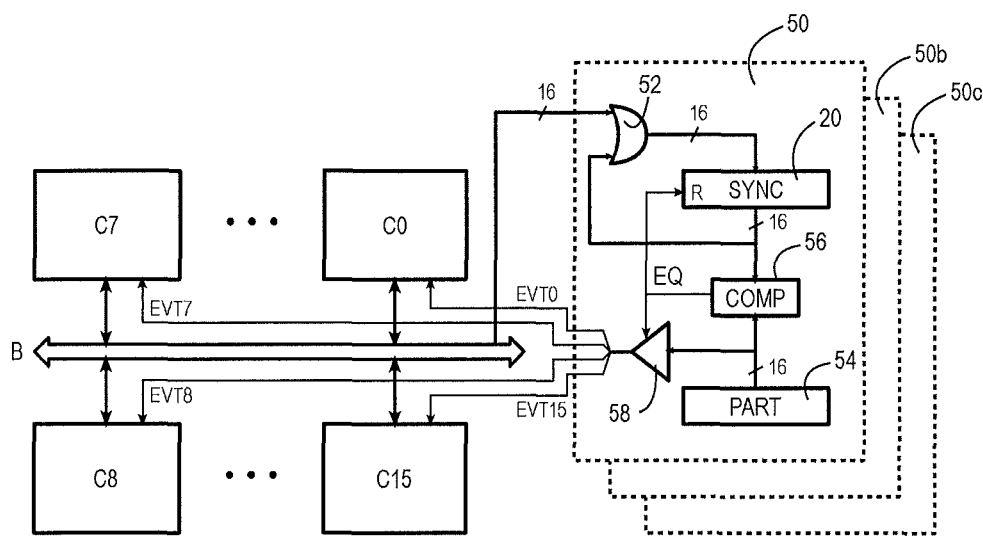
FIG. 5 shows an embodiment of a hardware synchronization barrier configured to synchronize processor cores connected to a bus.

FIG. 5 schematically depicts an embodiment of a hardware synchronization barrier configured to synchronize multiple cores C0-C15 connected to the same bus B.

In this structure, a hardware synchronization barrier 50 is formed around a synchronization register 20 that is writable by the cores through the bus B. If there are sixteen cores C0 to C15, the register 20 may have a size of sixteen bits, i.e. one bit per core that can participate in the barrier. Writing to the register 20 may be achieved through a gate 52 connected to produce a bitwise OR operation between the content of register 20 and the word presented on the bus for writing at the address assigned to the register 20.

The barrier 50 further comprises a participants register 54 programmable through the bus to contain a pattern identifying the cores participating in the barrier. A comparator 56 is connected to compare the contents of registers 20 and 54. When there is a match, the comparator 56 asserts a signal EQ that may generate a raise-barrier event EVT and reset the register 20 simultaneously. The raise-barrier event may be the transmission of the content of the participants register 54 to the cores through tri-state gates 58. More specifically, each bit of the register 54 may be transmitted through a dedicated line EVT0 to EVT15 to the core corresponding to the bit position. Thus, each core participating in the barrier is notified of the raised-barrier by the presence of the state 1 on its dedicated line EVT.

This structure allows to allocate an arbitrary group of cores to a group of program threads, by setting to 1 the bits corresponding to these cores in the participants register 54. Moreover, several similar synchronization barriers 50, 50b, 50c may be implemented in parallel for disjoint groups of cores, each comprising a pair of registers 20 and 54 that are accessible through the bus at dedicated addresses.

The operation of such a synchronization barrier is similar to that described for the master-slave barrier of FIG. 1, with the difference that the function of the master unit is accomplished by the circuit 50 and that the messages sent by the processing units PU are replaced with bus transactions initiated by the cores. The raised-barrier notification is achieved directly by the circuit 50 via the lines EVT, lines that the cores may be instructed to monitor by configuring a suspension instruction (WAIT) provided in the executable code of the program threads.

Figure 6:
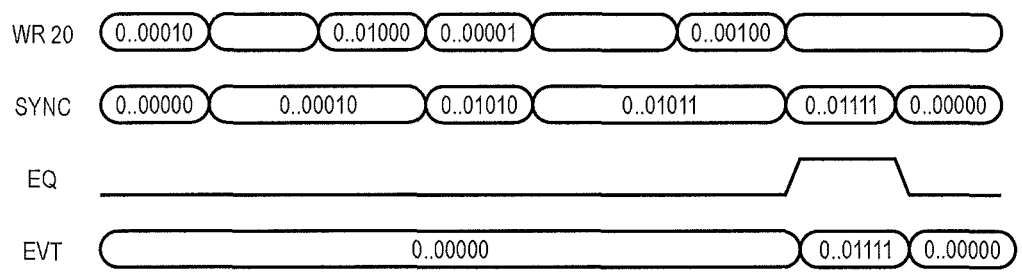
FIG. 6 is a timing diagram illustrating the operation of the synchronization barrier of FIG. 5 in the context of an example.

FIG. 6 is a timing diagram illustrating the operation of the synchronization barrier of FIG. 5 in the context of the example of FIGS. 2A to 2E. This timing diagram shows in rows WR 20, SYNC, EQ, and EVT write cycles in the register 20, the contents of register 20, the corresponding evolution of the comparison signal EQ, and the evolution of the raised-barrier notification EVT.

The cores designated to participate in the synchronization barrier are the cores C0 to C3, which are assigned the first four bits of the registers 20 and 54. The participants register 54 thus contains the sixteen-bit pattern 00 . . . 01111. The words written in the register 20 by the participating cores are sixteen-bit words in the format 000 . . . 0xxxx, where the twelve most significant bits of these words are not assigned to any core in the considered barrier (50). These available bits may be assigned to other groups of cores in parallel barriers (50b, 50c).

Initially, the synchronization register 20 contains a word SYNC having all bits to zero. The comparison signal EQ is inactive and the event lines EVT are all zero.

As the cores C0-C3 eventually reach the synchronization barrier, they write their identifier in the register 20 through the bus in the form of a bit to 1 at the corresponding bit-position of a 16-bit word. Each core suspends its thread, for example, by halting after writing its identifier, and waits for the activation of its respective event line EVT for restarting. In the cycle following each write, the register 20 is updated by a bitwise OR operation between the written word and the previous content of the register.

When the register 20 contains 00 . . . 01111, the signal EQ is activated, whereby the contents of the participants register 54 is presented on the event lines EVT. The cores resume the execution of the suspended threads. In the cycle following the activation of signal EQ, the content of the register 20 is reset, causing the deactivation of the signal EQ and of the event lines EVT.

The structure of FIG. 5 may be used in each cluster participating in synchronization through network messages according to FIG. 3. In this case, a first field of the registers 20 and 54, for example the sixteen least significant bits, may be dedicated to the local threads running on the cores of the cluster, and a second field, which extends the registers 20 and 54, may be dedicated to remote threads running in other clusters. The field extending the register 54 is however not transmitted on the event lines EVT, since these lines are dedicated to the local cores.

When a network message arrives identifying a remote thread, it may be processed by the cluster resource manager (for example one of the cores of the cluster), which writes this identifier in the register 20 through the bus, using the same mechanism as that used for the local threads.

When all the threads, local and remote, have reached the barrier, the contents of registers 20 and 54 coincide. The signal EQ is activated, causing the resumption of the suspended local threads.

In such an application, the registers 20 and 54 may be significantly large to handle a large number of cores, for example 64 bits or more. In this case it is preferred, in order to simplify the comparator 56, to just check that all the bits of the register 20 are at 1, which is achievable through a tree of AND gates operating on the only content of the register 20. The content of the register 54 is then not provided as a comparison argument to the comparator 56—it only serves to identify the event lines EVT to be activated when the signal EQ is activated.

For all the bits of the register 20 to be set to 1 at the end of the synchronization, whereas the number of participants is less than the size of the register, several methods may be used. For example, the register 20 may be reset at the beginning of a synchronization phase with a word having all bits to 1 except at the participants' positions. The holes of the register 20 are thus filled in as the cores write their synchronization words.

Another possibility is that the cores each write a synchronization word having all bits set between the position assigned to the core and the position assigned to the next core (or the end of the register for the last core). In other words, several positions of the synchronization register are assigned to each core, in such a way that the assigned positions together fill the synchronization register. For example, for a group of four participating cores and a 64-bit register 20, the positions assigned to the cores are 0, 16, 32 and 48. The core of rank i (where i varies between 0 and 3) will then write a 64-bit synchronization word whose bit positions $16i$ to $16i+15$ are set to 1.

What is claimed is:

1. A method for synchronizing multiple processing units, the method comprising the steps of:
    providing a synchronization register in a target processing unit;
    assigning a distinct bit position of the synchronization register to each processing unit;
    executing a program thread in each processing unit;
    when the program thread of a current processing unit reaches a synchronization point:
        executing a single write instruction in the current processing unit, targeting the synchronization register and conveying a mask word in which the bit position assigned to the current processing unit is set,
        responding to the single write instruction in a single cycle by overwriting the content of the synchronization register with an output of a connected bitwise logic gate to compare the content of the synchronization register with the mask word, and
        suspending the program thread; and
    when all the bits assigned to the processing units are set in the synchronization register, resuming execution of the suspended program threads.

2. The method of claim 1, comprising the further steps of:
    notifying an end of synchronization event when all the bits of the synchronization register are set;
    resuming the program threads in response to the end of synchronization event; and
    resetting the synchronization register.

3. The method of claim 2, comprising the further steps of interrupting a resource manager in the target processing unit when all the bits assigned to the processing units are set in the synchronization register; and
    notifying the end of synchronization event by the resource manager of the target processing unit.

4. The method of claim 2, wherein the end of synchronization event notification is multicast over a network.

5. The method according to claim 1, wherein when the content in the synchronization register is overwritten by only bits that are set in words written in the synchronization register, the synchronization register performs in one cycle a bitwise OR of the content with the written word.

6. A method of synchronizing parallel processes, the method comprising the following steps of:
    distributing multiple program execution threads between multiple processing units;
    providing respective synchronization registers in the processing units;
    assigning a distinct bit position of each of the synchronization registers to each program thread;
    when a current program thread in a current processing unit has reached a synchronization point:
        executing at least one write instruction in the current processing unit, targeting the respective synchronization registers of the processing units and conveying a mask word in which the bit position assigned to the current program thread is set,
        responding to the write instruction in each processing unit in a single cycle by overwriting a content of the respective synchronization register with an output of a connected bitwise logic gate to compare the content of the respective synchronization register with the mask word, and
        suspending the current program thread; and
    when all the bits assigned to the program threads are set in the synchronization register of a current processing unit: (i) resuming execution of the suspended program threads in the current processing unit, and (ii) resetting the synchronization register of the current processing unit.

7. The method of claim 6, carried out in processing units connected by a network-on-chip, the method further comprising the steps of:
    communicating between processing units by sending messages on the network-on-chip; and
    writing to the respective synchronization registers of the processing units by multicasting a message from the current processing unit to all the processing units, including the current processing unit itself.

8. The method of claim 6, comprising the following steps carried out within each processing unit:
    comparing the content of the respective synchronization register with an expected value;
    asserting a notification signal when the comparison is true; and
    resuming execution of the suspended program threads in response to the assertion of the notification signal.

9. The method of claim 8, comprising the following steps carried out within each processing unit:
    running in parallel several program threads on respective cores of the processing unit;
    programming a register of participants with a word having bits set at positions assigned to the cores;
    when a thread reaches its synchronization point, suspending the execution of the thread;
    upon assertion of the notification signal, providing the bits of the register of participants to the respective cores on dedicated lines; and
    resuming the execution of the thread in each core for which the dedicated line is set.

10. The method according to claim 8, comprising the step of:
    resetting the respective synchronization register in response to the assertion of the notification signal.

11. The method according to claim 6, wherein when the content in the respective synchronization register is overwritten by only bits that are set in words being written in the respective synchronization register, the respective synchronization register performs in one cycle a bitwise OR of the content with the written word.

* * * * *